July 11, 1967 L. G. KILMER ET AL 3,331,050
METHOD OF UNDERWATER SEISMIC EXPLORATION
Filed April 16, 1965 2 Sheets-Sheet 1

INVENTORS
LAUREN G. KILMER
JOHN BEMROSE

BY McLean, Morton and Boustead
ATTORNEYS

July 11, 1967  L. G. KILMER ET AL  3,331,050
METHOD OF UNDERWATER SEISMIC EXPLORATION
Filed April 16, 1965  2 Sheets-Sheet 2

INVENTORS
LAUREN G. KILMER
JOHN BEMROSE

BY McKean, Morton and Boustead
ATTORNEYS

3,331,050
METHOD OF UNDERWATER SEISMIC EXPLORATION

Lauren G. Kilmer and John Bemrose, Tulsa, Okla., assignors, by mesne assignments, to Sinclair Research, Inc., New York, N.Y., a corporation of Delaware
Filed Apr. 16, 1965, Ser. No. 448,827
7 Claims. (Cl. 340—7)

This invention relates to submarine seismic prospecting and exploits successive actuation of one or more submerged sources of sound waves continuously moved along an underwater path to obtain data useful in reflection or refraction surveying of the earth's subsurface.

It has been customary in submarine seismic prospects to use a prepositioned charge of dynamite or the like as a source of energy of needed amplitude and character for producing seismic waves, subterranean reflections or refraction of the seismic waves so produced being detected by one or more geophones which can be submerged or located at the water's surface. The use of such explosives has several disadvantages, however, such as the necessity for emplacement of the explosive charges and the problems incident to establishing firing circuits to each of a number of charges in successive order whenever a continuous reading is to be made. Furthermore, when the explosive shot emanates from a point source, as is the case with the explosive cartridge arrangement, the efficiency of the generated wave is low, for the reason that the rate of changes of pressure and duration of the pressure peak do not correspond to the frequency most favorable to seismic wave propagation in an aqueous medium. It has been found necessary in the use of explosives to employ charges in relatively large quantities to effect deep penetration by the resultant seismic wave within a subaqueous geological formation by reason of the undesired frequencies and inefficient character of the wave thus produced.

It has also been known to generate low frequency waves from a continuously moving vessel. In such systems, the seismic waves are generated by a sonic generator within a powered vessel or a towed barge transmitting the sound vibrations to a flexible diaphragm in the bottom of the vessel or barge. Such methods have the disadvantage that the vessel supporting the energy source acts as a sounding board, frequently giving off harmonic vibrations which interfere with the predominant frequency of the prime sound waves, leading at best to weakening of the primary signal or at worst to interference with accurate readings on the seismograph. Also, in such situations, the upward force of the sound wave cannot be used to reinforce the downward force.

In general, the present invention overcomes the disadvantages of prior marine seismic surveying methods by using a particular type of seismic energy source or sources, which permits the summation of the recordings of energy from successive actuations of the source or sources, while the source, and receiver, if desired, are towed behind a vessel. Copending Kilmer applications Ser. No. 187,111, filed Apr. 12, 1962, now Patent No. 3,235,027, and Ser. No. 314,230, filed Oct. 7, 1963, describe sources of seismic waves which are of particular use in the system of this invention. The devices can be repeatedly used following a regular cycle of pulsed or sequential firing at equal or variable time intervals. In general, the devices described in said copending applications use a gas explosion confined in a vertically expansible chamber to impart a compressive impulse and initiate a seismic wave. The chamber which contains the gas explosion has a bottom pressure plate of considerable area which transmits the force of the explosion to the land, air or water medium to be seismically explored.

Surmounting the expandible chamber is a dead weight of substantial mass. The explosion or violent combustion of a gas mixture produces a shock wave which ordinarily would be transmitted equally in all directions, however, the great inertia of the dead weight surmounting the chamber and the lateral rigidity of the walls of the chamber direct the major portion of the force of the explosion downwardly against the pressure plate, thus causing a substantial movement of the plate, which, as mentioned, is of considerable area. The force of the explosion thus applies compressive stress quickly at the interface beneath the chamber to initiate a seismic wave. The frequency of detonation within the expansible chamber is arranged, in coordination with the size of the pressure plate, to give sound pulses of the desired frequency. The combustion gas mixture usually includes air or oxygen mixed with a combustible gas such as propane, propylene, ethylene, acetylene, etc.

In marine seismic reflection and refraction surveying the peculiar characteristics of the device described, namely, an almost constant wave form, energy level, and initiation time, permit the summation of seismogram trace recordings of the energy received from successive actuations of the energy source in a manner that increases the signal-to-noise ratio by virtue of the summation of events in the same phase. The energy output from a single source of this particular kind is believed to be greater than gas exploder sources normally used in marine surveying, however, the use of other sources of sonic vibration is to considered within the scope of the seismic system of this invention.

In this invention, successive actuations of the energy source are made. This permits the summation of seismic recordings while the source and receiver are towed continuously behind a survey vessel. Nearly constant pulse initiation time permits multiple sources to be used simultaneously and in phase for increased energy augmentation. The expandible chamber or bellows may have a spring or other means for recompression of the chamber between explosions. Thus a spring may reestablish the close relationship between the dead weight and the pressure plate in preparation for the next explosion. Any suitable means, for example a spring loaded valve, may be employed to vent the exhaust gases. Preferably, in this invention, these gases pass via a sound muffler directly into the water without developing compressional waves of any magnitude to interfere with the normal reception of seismic reflection energy by geophone-type receivers. It has been found that the frequency of the pulse generated by the device can be varied within limits by altering the proportions of the explosive gases constituting the mixture in the neighborhood of the ideal stoichiometric proportions. Thus the most effective seismic wave pulse for the particular sedimentary conditions below the sea bottom can be generated for more efficient reflection and refractions shooting.

This invention preferably employs paravanes, which are torpedo shaped hulls, fitted with hydroplanes and rudders to carry the energy sources so that one or any desired pattern of seismic energy sources can be used and fired simultaneously while in motion. However it will, again, be understood that any nautical device designed to keep the hull at a desired depth and offset when towed by a ship, can be used. The paravane may be a form of sea sled with hydrofoil surfaces which are adjustable. Two hulls containing ballast tanks to achieve positive or negative buoyancy of the system as a whole may be joined together to support an energy source. The sled or paravane also has a fuel supply and electrical circuitry necessary to fire the gas mixture at the desired time intervals. The firing circuits may be actuated by an operator, for example, in the survey vessel, via a line adjacent the tow cable.

The paravane enables the energy source to be placed at a predetermined depth in the water to create reinforcement by reflection of the sound wave from the water-air interface. For example, with the device of the Kilmer copending application referred to above, when the device is suspended in water with the diaphragm horizontal and below the inertia mass, although the forces of the gas explosion impart an impulse to the diaphragm and cause a compressional wave pulse to be generated in the water in the downward direction, the same explosive force also imparts an impulse to the inertia mass which in turn causes a compressional wave pulse to be generated in the water which travels in the upward direction. This upward traveling pulse is reflected downward by the air-water surface and undergoes a phase change of ($\pi/2$) so that if the distance of the device from the water surface is equal to an odd number of quarter wave lengths of the dominant wave lengths of the upward traveling pulse, then the reflected pulse will be in phase with the downward traveling pulse. Thus the sound of the energy source is reinforced. The depth of the device below the water surface can be chosen for phase reinforcement of the downward pulse by the pulse reflected from the water surface. The exact depth chosen will depend on the frequency of the vibration and can be adjusted as desired by changing the operating depth of the paravanes supporting the gas exploder. Thus, the paravane can be kept at a constant depth below the surface of the water equal to any odd fourth (¼, ¾, 5⁄4, etc.) of the wave length of the sound emitted from the energy source, so that reflection of the first wave from the air-water interface, with its accompanying phase-change, will reinforce the second sound wave emitted.

The depth to be employed is a function of the velocity of sound and the frequency of the sound vibration.

Usually the sound velocity will range from about 4980 to 5000 ft./second at the surface, depending on the air temperature, to between about 4880 and 4900 ft./second at 750 fathoms. At depths increasingly lower than 750 fathoms, because of increasing pressure, the velocity increases, passing 5000 ft./second at about 2000 fathoms.

Wave length is determined from the equation $Y=V/F$ where F is the predominant sound frequency. Where the energy source has a predominant frequency of 50 cycles per second and the velocity of the sound is 5000 ft./second the wave length is 100 feet. Thus a paravane having an energy source emitting such waves and kept at an odd fourth of the wave length, that is, 25 or 75, etc., feet below the surface of the water, would create a condition in which reflections of the upwardly moving wave from the air-water interface serve to reinforce the downwardly traveling wave emanating directly from the sound generator.

A particularly advantageous embodiment of the instant invention is one wherein a plurality of sounding devices are towed at a multiplicity of depths below the surface of the water. The depth of each energy source is predetermined so that its sound wave will reinforce the sound wave emanating from the device above it. In a more sophisticated arrangement, the sound waves of alternate sounding devices reinforce each other. In each situation the energy sources are preferably placed at an odd fourth of the wave length below the water surface.

The method of this invention also employs a receiving device for the reflected seismic waves which can be of any type known to the art which is suitable for the purpose. Advantageously, the system uses a detector streamer comprising a plurality of microphone sections connected together by coupling sections and an additional section, which can be, for example, the tow line, connected to the coupling section ahead of the leading microphone streamer section. In practice it has been found that an overall length of 300 feet is suitable for a microphone streamer section and that a length of 300 feet for the towing section is sufficient to maintain the microphone detectors at a sufficient distance from the vessel to be free of pressure effects within the water caused by the ship's propeller and the movement of the vessel therethrough. The detector streamer can conveniently comprise six microphone sections connected by five coupling sections and secured to a towing section by a sixth coupling section. Within each of the microphone sections is located a plurality of, for example, piezoelectric microphones and a plurality of amplifying units respectively connected thereto.

In accordance with a preferred arrangement of the microphone streamer assembly, three microphones located at the midpoint and 25 feet from each end of the microphone streamer respectively have been found satisfactory. While this arrangement is disclosed herein with particularity for the purpose of description, it will be understood that additional microphones spaced at more frequent intervals, along the detection streamer or otherwise may, if desired, be employed.

Each microphone section usually comprises a length of tubing clamped at one end thereof to a complementary element of a coupling member, through which strain wires and electrical conductors are disposed in apertures respectively corresponding to apertures within the coupling member. The microphonic sections can also contain a plurality of microphonic casings, a microphone being arranged within each of the microphone casings and responsive to variations in pressure of the oil or similar fluid with which the detection streamer is filled.

The method of this invention also provides for arrangement of a plurality of sounding devices in a more or less fixed pattern with relation to the receiver at about the same depth in the water. Such arrangements of several energy sources in more or less the same plane generally parallel to the surface of the water, along with synchronization of the sound waves emitted by each device provides for a "flat" sound pulse of considerable area. Several "planes" of seismic generators may be used, again arranged for in-phase reinforcement of the waves emitted by each "plane."

The invention will be better understood by reference to the accompanying drawings in which.

Figure 1:
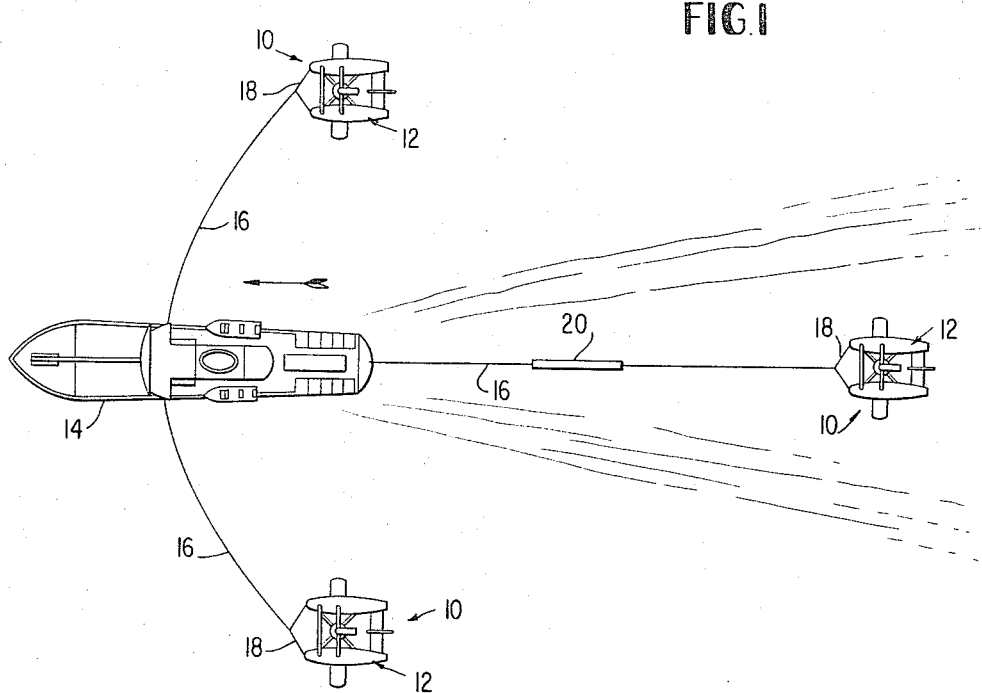
FIGURE 1 is a diagrammatic plan view looking down at a system of the present invention in accordance with one embodiment thereof.
Figure 2:
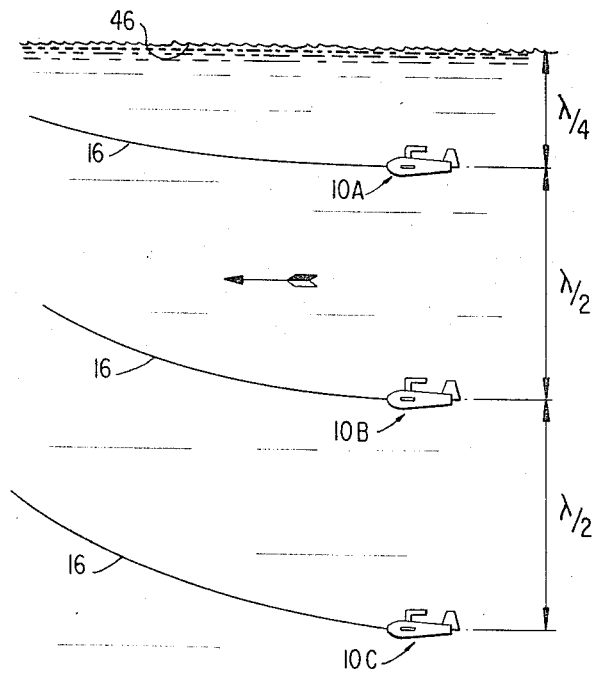
FIGURE 2 is an elevational view of the same or a different system shown in FIGURE 1.

Referring now to the drawings and more particularly to FIGURES 1 and 2 there is shown a group of acoustic signal generators for seismic signals suitable for underwater geophysical prospecting indicated generally by the numerals 10 and comprising paravanes 12 adapted to be towed in the direction of the arrows by a vessel 14 using, for example, the tow lines 16 and paravane connections 18.

As shown in FIGURE 1, a seismic detection streamer 20 may be interposed between paravane 12 and survey ship 14 on tow line 16. The detection streamer may be of any type suitable for the purpose such as a system which comprises a plurality of piezoelectric microphones spaced at intervals within an oil-filled flexible streamer and electrically connected to seismic recording apparatus on the towing vessel 14.

Figure 3:
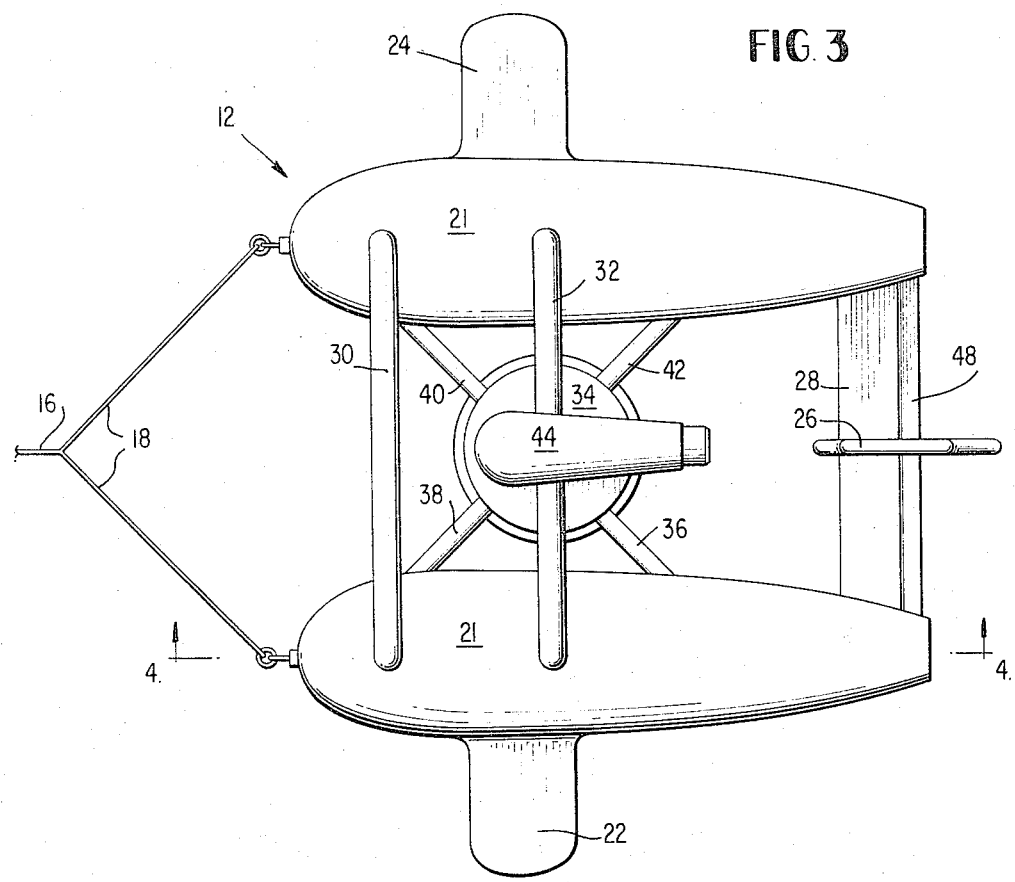
FIGURE 3 is a top view of the acoustic signal generating and receiving device of FIGURE 2.
Figure 4:
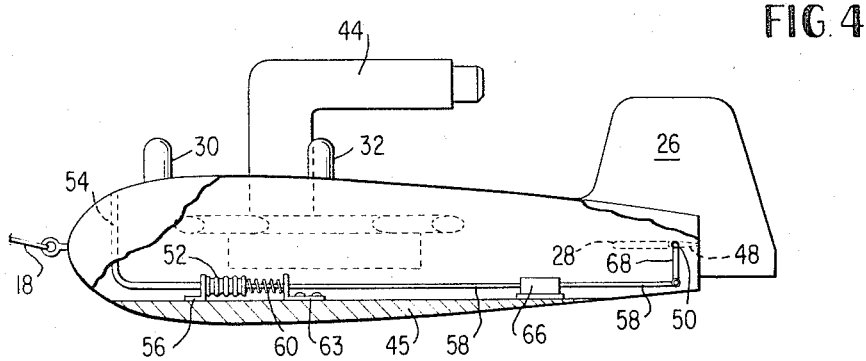
FIGURE 4 is a sectional elevational view of the device along the line 4—4 of FIGURE 3.

FIGURES 3 and 4 show in greater detail exemplary models of a paravane. The paravane 12 comprises dual streamlined casings or hulls 21 provided with horizontal hydrofoils 22 and 24, and a vertical rudder fin 26 supported by horizontal hydrofoil 28 which connects the tail ends of streamlined hulls 21. The nose ends of streamlined hulls 20 are connected by support 30 while the midsection of the casings are connected by support 32. Intermediate the hulls and connected at opposite inside surfaces of each, there is provided a gas exploding device 34 supported by struts 36, 38, 40 and 42 which are fixedly attached to the hulls 21. Suspended above and in communication with gas exploding device 34, is muffler and exhaust device 44. The two hulls 21 contain ballast 45 (FIGURE 4) to achieve positive or negative buoyancy of the paravane. They also contain a fuel supply and electrical circuitry necessary to fire a gas mixture within gas exploder 34 at the desired time interval. The firing circuits may be actuated by the operator in survey vessel 14 through the tow cables 16 and connections 18. The gas exploding device 34 as explained above usually consists essentially of a vertically extensible side wall enclosing a chamber having a pressure plate on one side and a heavy inertia mass on the other. Explosive gas mixtures are fed to the chamber from the hulls 21 and exploded by an ignition spark following a more or less standard internal combustion engine cycle.

When the device is suspended in water with the pressure plate horizontal and below the dead weight, the forces of regular gas explosions impart a rhythmic impulse to the pressure plate and cause a compressional wave pulse to be generated in the water in the downward direction. The same explosive forces also impart impulses to the inertia mass which in turn causes a weaker compressional wave pulse to be generated in the water which travels in the upward direction. This upward traveling pulse is reflected downward by the air-water interface 46 shown in FIGURE 2. After each explosion the exhausted gases are expelled through a spring-loaded valve (not shown) through a sound muffler and exhaust device 44 in communication with gas exploding device 34.

The hulls 21 are adapted to be towed through the water at any depth desired. A moveable horizontal fin 48 on hydrofoil 28 is pivoted at 50 and is employed to bring the paravane to a predetermined depth and maintain it at such depth.

One system for presetting and controlling the fin is illustrated in FIGURE 4. In this system the control mechanism responds to movement of a bellows 52 fastened within the hull 21. The interior of the bellows communicates with water external of the hull 21 by means of the duct 54. One end of the bellows is fixedly attached to the support 56 while the moveable end is connected to control rod 58. This control rod, beginning at the bellows, passes sequentially through spring 60, bracket 63, and dashpot 66, the other end of rod 58 being joined to control arm 68, which in turn, is fastened to the fin 48. The bracket 63 also serves to compress the spring 60 while the dashpot 66 prevents too-rapid movement of the control rod 58. The linkages are arranged so that expansion of the bellows 52 causes upward movement of the trailing edge of fin 48 while contraction of the bellows causes downward movement of this trailing edge. When the spring pressure on the outside of the bellows equals the hydrostatic pressure on the inside of the bellows the fin 48 is horizontal.

The depth at which the paravane will operate is predetermined by the position of bracket 63 and the compressive force of spring 60. The bracket 63 is arranged before the paravane is placed in the water, so that the compressive force of spring 60 is equal to the hydrostatic pressure of the water at the depth desired for operation of the sonic energy source. Before the paravane is placed in the water, therefore, the spring pressure from 60 is greater than pressure inside the bellows 52 and the rod 58 will be pulled toward the front of the hull 21, pulling down the trailing edge of fin 48 well below the level of hydrofoil 28. When placed in the water in this position, the fin 48 will cause the paravane to go beneath the surface of the water and water will be able to enter the duct 54, transmitting the pressure of the water to the inside of the bellows. Descent of the paravane further causes a gradual build-up of pressure within the bellows due to increased pressure of water outside the hull at lower depths. This gradual pressure build-up within the bellows causes a gradual movement of the free end of the bellows against the pressure of spring 60 along with a gradual movement of rod 58 toward the rear of the hull and a gradual elevation of trailing edge of fin 48 until the proper depth below the surface of the water is reacted.

It will be readily understood that accidental divergence of a paravane from the proper depth will result in a change of pressure inside the bellows 52 along with movement of the rod 58, toward the front of the hull when pressure is reduced or toward the rear of the hull when pressure is increased. Such rod movements result in downward or upward movement of the trailing edge of fin 48 respectively, along with further depression or elevation of the paravane, respectively, thus compensating for the accidental divergence and bringing the paravane once more to the predetermined correct depth.

As an example of the use of the method of this invention, a group of nine paravanes of the type described are towed behind a ship traveling at about six knots. The paravanes are arranged in three "planes," the arrangement in each plane being about as shown in FIGURE 1, the central upper-most tow-line being provided at about its midsection with a sound receiver of the type described. The "planes" are arranged with the paravanes of one plane substantially directly below the paravanes of the plane above. The planes are set at 25, 75 and 125 feet below the water surface corresponding to positions 10A, 10B and 10C in FIGURE 2. The sounding devices are arranged to give a dominant sound frequency of 50 cycles per second.

The water sound velocity being about 5000 feet per second, a firing sequence is established so that after the sounding device in position 10A is fired, 10 milliseconds elapse before the energy source in position 10B is fired and another 10 milliseconds elapses before the device in position 10C is exploded. Since the frequency chosen is 50 c.p.s., each device fires once every 20 milliseconds and the uppermost plane of devices fires at the same time as the lowermost plane. Thus when the sound from the first-fired device reaches the next lowermost device, the second device fires and a combined wave is formed. Likewise, when the lowermost energy source is activated it is in phase with this combined wave reaching it from above and provides a doubly reinforced compression wave. The waves are further reinforced by the in-phase reflections of the wave from the air-water interface.

It can thus be seen that in the method of this invention an energy source provides a stronger compressional wave pulse due to reflections from the air-water interface. The method permits the upward pulse from explosions within a submerged sound generator to be used to augment a later phase of the downward pulse by operating the device at a particular depth below the water level and also may provide several energy sources operating simultaneously in appropriate geometrical patterns to produce downward compressional waves substantially planar in form to minimize energy loss experienced by conventional apparatus and methods, which usually produce spherical waves. Thus, the method of this invention permits the mapping of reflection horizons below the sea bottom to a greater depth than has been possible previously, while at the same time allowing the structural detail made possible by the frequency of the sound wave. Since the frequency content of the generated wave pulse may be varied to some degree by altering the mixture of the explosive gases, reflection events of a certain dominant frequency may be enhanced as desired. Compressional wave energy can be strengthened still further by operating several devices simultaneously in an appropriate geometrical pattern so as to augment the downward compressional waves so that they descend more as plane waves than spherical waves. Thus energy lost by spreading is minimized and deflection energy enhanced.

It is claimed:

1. A method for underwater seismic surveying which comprises generating below the surface of the water seismic waves having an established frequency, said waves traveling upwardly and downwardly from their source, while providing a freeboard distance between the source of said waves and the surface of the water substantially equal to a multiple of one fourth of the wave length of the frequency of the seismic waves emitted from the source to reflect upwardly traveling waves at the water-air interface which reinforce succeeding downward traveling waves, and receiving and recording the reflections of the downwardly traveling waves.

2. The method of claim 1 in which the said source of seismic waves is moving at a constant rate through the water generally parallel to the surface of the water.

3. The method of claim 2 in which the freeboard distance is equal to about ¼ of the wavelength of the dominant frequency of the seismic waves.

4. The method of claim 1 in which a plurality of sources of seismic waves are provided in a plane generally parallel to the surface of the water and emit seismic waves of the same frequency in phase.

5. A method of underwater seismic surveying which comprises generating seismic waves having an established frequency from a plurality of sources of seismic waves placed vertically one below the other below the surface of the water, providing a freeboard space between each source and its adjacent source substantially equal to a multiple of one fourth of the wave length of the frequency of the seismic waves emitted from the source to reinforce downwardly moving waves from said lowermost source with downwardly moving waves from an upper source, and receiving and recording the reflections of the downwardly traveling waves.

6. The method of claim 5 in which the sources of said waves are moving at a constant rate through the water generally parallel to the surface of the water.

7. The method of claim 5 in which there are a plurality of said seismic sources provided in a plurality of planes beneath the surface of the water and generally parallel to the surface of the water, each said source emitting seismic waves of said established frequency in phase, the sources in the planes being spaced vertically one below the other a freeboard distance substantially equal to a multiple of one fourth of the wave length of the frequency of the seismic waves emitted from the source.

References Cited
UNITED STATES PATENTS

| | | | |
|---|---|---|---|
| 2,401,929 | 6/1946 | Hammond | 340—7 X |
| 2,465,696 | 3/1949 | Paslay | 340—7 X |
| 2,757,356 | 7/1956 | Haggerty | 340—7 |

SAMUEL FEINBERG, *Primary Examiner.*

BENJAMIN A. BORCHELT, *Examiner.*

P. A. SHANLEY, *Assistant Examiner.*